United States Patent
Boland

(10) Patent No.: US 8,555,455 B2
(45) Date of Patent: Oct. 15, 2013

(54) WINDSCREEN WIPER DEVICE COMPRISING AN ELASTIC, ELONGATED CARRIER ELEMENT, AS WELL AS AN ELONGATED WIPER BLADE OF A FLEXIBLE MATERIAL, WHICH CAN BE PLACED IN ABUTMENT WITH THE WINDSCREEN TO BE WIPED

(75) Inventor: Xavier Boland, Arlon (BE)

(73) Assignee: Federal-Mogul S.A., Aubange (BE)

( * ) Notice: Subject to any disclaimer, the term of this patent is extended or adjusted under 35 U.S.C. 154(b) by 858 days.

(21) Appl. No.: 12/493,550

(22) Filed: Jun. 29, 2009

(65) Prior Publication Data
US 2009/0320230 A1 Dec. 31, 2009

(30) Foreign Application Priority Data
Jun. 27, 2008 (EP) .................................... 08159170

(51) Int. Cl.
*B60S 1/40* (2006.01)
*B60S 1/38* (2006.01)

(52) U.S. Cl.
USPC ................. 15/250.201; 15/250.32; 264/279.1

(58) Field of Classification Search
USPC ........... 15/250.43, 250.44, 250.361, 250.451, 15/250.32
See application file for complete search history.

(56) References Cited

U.S. PATENT DOCUMENTS

| | | | | |
|---|---|---|---|---|
| 6,467,985 B1 * | 10/2002 | Daenen | ........................... | 403/79 |
| 6,550,096 B1 | 4/2003 | Stewart | | |
| 6,581,237 B1 * | 6/2003 | Kotlarski | ................... | 15/250.32 |
| 6,944,905 B2 * | 9/2005 | De Block et al. | ........ | 15/250.201 |
| 7,293,321 B2 * | 11/2007 | Breesch | ................... | 15/250.201 |
| 2005/0011033 A1 | 1/2005 | Thomar | | |
| 2005/0172443 A1 * | 8/2005 | Genet et al. | ............. | 15/250.201 |
| 2012/0000028 A1 * | 1/2012 | Wilms et al. | ............... | 15/250.33 |

FOREIGN PATENT DOCUMENTS

WO WO2005/087560 A 9/2005
WO WO2007/045549 * 4/2007

* cited by examiner

*Primary Examiner* — Gary Graham
(74) *Attorney, Agent, or Firm* — Robert L. Stearns; Dickinson Wright, PLLC

(57) ABSTRACT

A windscreen wiper device includes an elastic, elongated carrier element, as well as an elongated wiper blade of a flexible material, which can be placed in abutment with a windscreen to be wiped. the wiper blade includes at least one groove, in which groove at least one longitudinal strip of the carrier element is disposed. The windscreen wiper device comprises a connecting device for an oscillating wiper arm, with the special feature that the connecting device comprises an internal reinforcement element.

5 Claims, 3 Drawing Sheets

Figure 1:
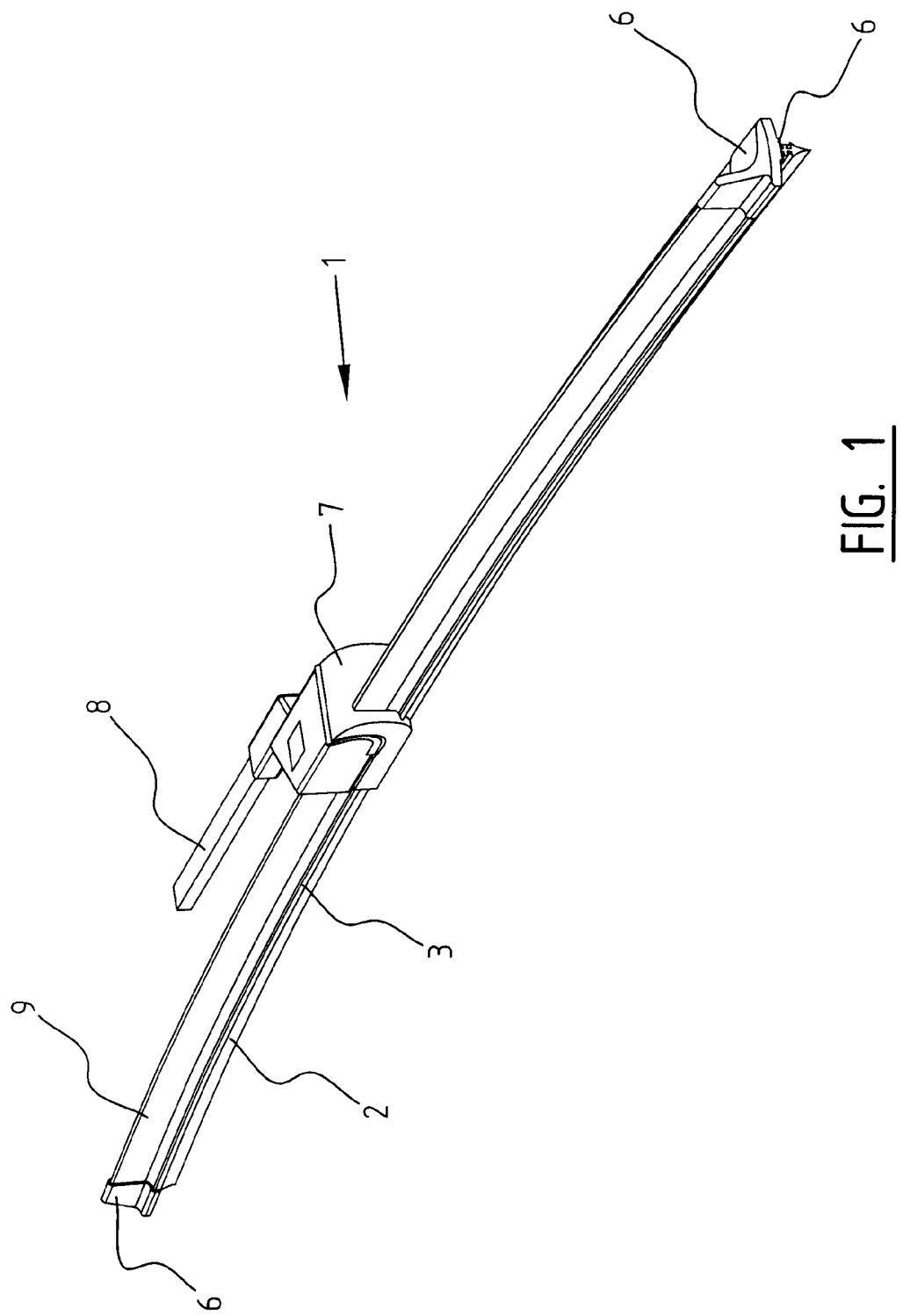

WINDSCREEN WIPER DEVICE COMPRISING AN ELASTIC, ELONGATED CARRIER ELEMENT, AS WELL AS AN ELONGATED WIPER BLADE OF A FLEXIBLE MATERIAL, WHICH CAN BE PLACED IN ABUTMENT WITH THE WINDSCREEN TO BE WIPED

BACKGROUND OF THE INVENTION

1. Technical Field

This application claims priority to European Patent Application No. 08159170.3 filed Jun. 27, 2008, and is incorporated herein by reference.

2. Related Art

The invention relates to a windscreen wiper device comprising an elastic, elongated carrier element, as well as an elongated wiper blade of a flexible material, which can be placed in abutment with a windscreen to be wiped, which wiper blade includes at least one longitudinal groove, in which groove at least one longitudinal strip of the carrier element is disposed, which windscreen wiper device comprises a connecting device for an oscillating wiper arm.

Such a windscreen wiper device is generally known. The prior art windscreen wiper device is in particular designed as a "yokeless" wiper device or "flat blade", wherein use is no longer made of several yokes pivotally connected to each other, but wherein the wiper blade is biassed by the carrier element, as a result of which it exhibits a specific curvature.

In practice it is felt that, the plastic connecting device (in practice also called "connector") can be easily damaged, for example when a person smashes the wiper blade onto the windscreen to be wiped with a considerable force in an attempt to wipe of any snow on the wiper blade.

SUMMARY OF THE INVENTION

The object of the invention is to improve the prior art as indicated above, in particular to provide a windscreen wiper device, wherein the connecting device is less vulnerable in the sense that it can withstand large forces applied thereon.

In order to accomplish that objective, a windscreen wiper device of the kind referred to in the introduction is characterized in that the connecting device comprises an internal reinforcement element. The reinforcement is particularly designed as a separate constructional element that can be inserted into the connecting device in order to reinforce the connecting device.

In one preferred embodiment of a windscreen wiper device in accordance with the invention the connecting device is made of plastic, wherein the reinforcement element is made of metal. This makes it possible to cast the plastic in a mould around the reinforcement element. Particularly, such a molding operation would ensure that the connecting device with the incorporated reinforcement element can be formed in a reliable and controllable manner, without high costs as far as additional tools and equipment are concerned. Preferably, the reinforcement element is fully surrounded by the plastic material of the connecting device.

In another preferred embodiment of a windscreen wiper device in accordance with the invention the wiper blade includes opposing longitudinal grooves on its longitudinal sides, in which grooves spaced-apart longitudinal strips of the carrier element are disposed, wherein neighboring ends of the longitudinal strips are interconnected by a respective connecting piece, wherein the connecting device comprises engaging members engaging around the longitudinal strips, so that the strips are mounted in the grooves formed by the engaging members, wherein the reinforcement element has an at least substantially U-shaped cross-section, and wherein the legs of the U-shaped cross-section are provided inside the engaging members. Preferably, the base of the U-shaped cross section is provided inside a base of the connecting piece. Accordingly, the present connecting device is reinforced at locations where large forces are applied thereon, namely at the locations where the connecting device is interconnected with the strips.

In another preferred embodiment of a windscreen wiper device according to the invention the outer ends of the legs of the U-shaped cross-section are bent inwardly. In other words, the legs ideally follow the form of the engaging members which form grooves wherein the strips are mounted.

In another preferred embodiment of a windscreen wiper device in accordance with the invention the reinforcement element is provided with weakening locations. These weakening locations, for example weakening lines or points, ensure that the connecting device has a certain flexibility in longitudinal direction, whereas it maintains its stiffness in transversal direction. Particularly, the weakening locations comprise through holes.

The invention also relates to a method for manufacturing a windscreen wiper device according to the present invention, wherein the connecting device is made of plastic, wherein the reinforcement element is made of metal, and wherein the plastic is cast in a mold around the reinforcement element.

THE DRAWINGS

Figure 2:
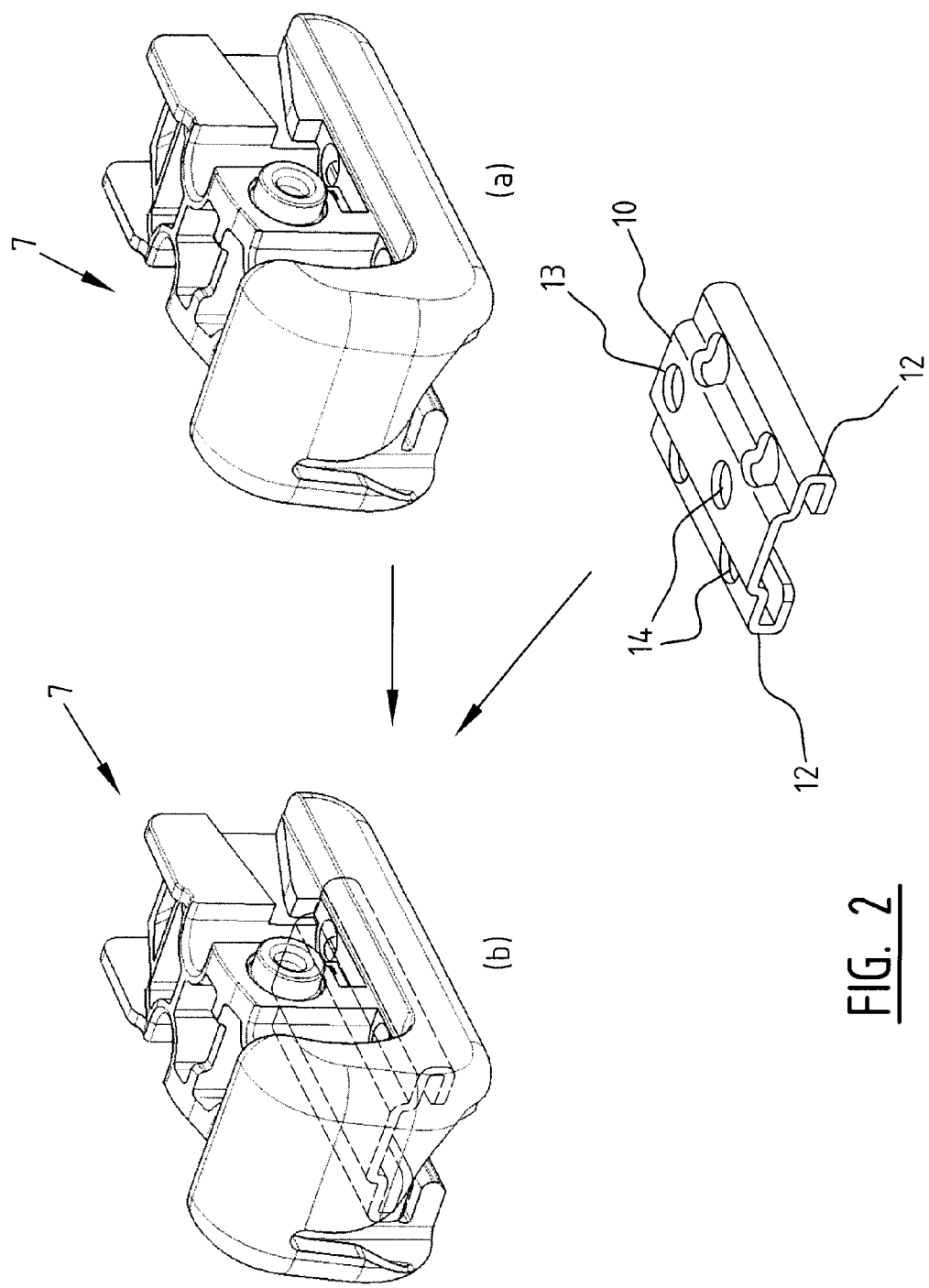
Figure 3:
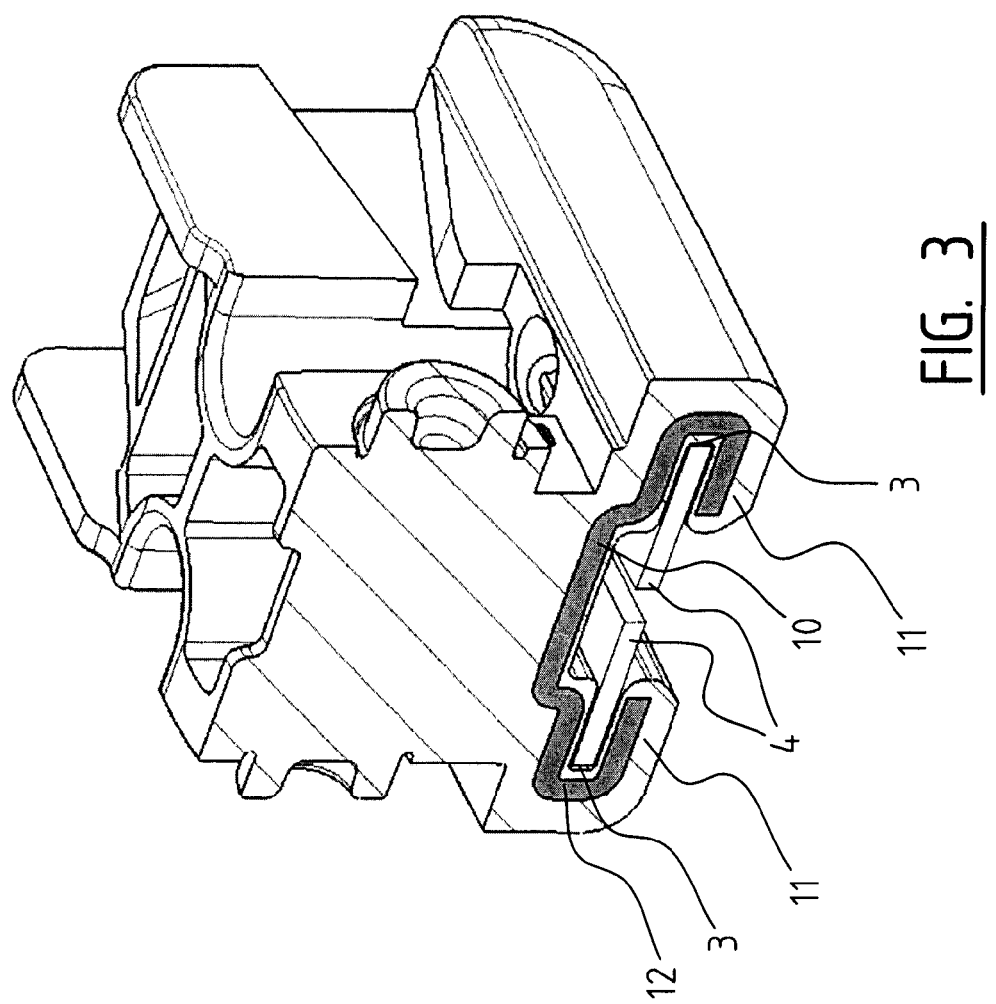

The invention will now be explained in more detail with reference to figures illustrated in a drawing, wherein:

FIG. 1 is a perspective, schematic view of a preferred embodiment of a windscreen wiper device according to the invention; and FIGS. 2 and 3 show details of the connecting device of FIG. 1.

DETAILED DESCRIPTION

FIG. 1 shows a preferred variant of a windscreen wiper device 1 according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3 (FIG. 3). The strips 4 form a flexible carrier element for the rubber wiper blade 2, as it were, which is thus biassed in a curved position (the curvature in operative position being that of a windscreen to be wiped). Neighboring ends 5 of strips 4 are interconnected on either side of the windscreen wiper device 1 by means of plastic connecting pieces 6 being separate constructional elements. The windscreen wiper device 1 is further equipped with a plastic connecting device 7 for an oscillating arm 8, and a spoiler 9.

FIG. 2 shows the plastic connecting device 7 without (FIG. 2a) and with (FIG. 2b) a metal reinforcement element 10 designed as a separate constructional element. As can be seen from FIG. 3, the connecting device 7 is equipped with engaging members 11 in one piece therewith, wherein the engaging members 11 engage around the longitudinal strips 4, so that the strips 4 are mounted in the grooves 3 formed by the engaging members 11. The reinforcement element 10 has an U-shaped cross-section, wherein the legs 12 of the U-shaped cross-section are provided inside the engaging members 11. With reference to FIGS. 2 and 3, the outer ends of the legs 12 of the U-shaped cross-section are bent inwardly, so that the legs 12 ideally follow the curved form of the engaging members 11. The base 13 of the U-shaped cross section is provided inside a base of the connecting piece 7. The reinforcement element 10 is provided with weakening locations in the form of through holes 14 in order to increase its flexibility in longitudinal direction, and to maintain its stiffness in transversal direction.

As already indicated, the connecting device 7 is entirely made of plastic, wherein the reinforcement element 10 is entirely made of metal. When manufacturing the present connecting device 7, the plastic is cast in a mold around the reinforcement element 10.

The present invention is not limited to the embodiment shown, but extends also to other embodiments falling within the scope of the appended claims.

What is claimed is:

1. A windscreen wiper device comprising an elastic, elongated carrier element, as well as an elongated wiper blade of a flexible material, which can be placed in abutment with a windscreen to be wiped, which wiper blade includes opposing longitudinal grooves on its longitudinal sides, in which grooves spaced apart longitudinal strips of the carrier element are disposed, which windscreen wiper device comprises a connecting device secured to said carrier element for an oscillating wiper arm, and which windscreen wiper device further includes a pair of connecting pieces interconnecting neighboring ends of said longitudinal strips of said carrier element and spaced longitudinally from one another and from said connecting device, and a spoiler extending longitudinally between said connecting device and each of said connecting pieces and wherein said connecting device is made of plastic and includes a metal reinforcement element molded in situ with said plastic connecting device and thereby said metal reinforcement element is embedded inseparably in said plastic connecting piece independently of the securement of said connecting device to said carrier element, and wherein said connecting device comprises engaging members engaging around said longitudinal strips, wherein said reinforcement element has an at least substantially U-shaped cross-section, and wherein legs of the U-shaped cross-section are provided inside said engaging members, and wherein a base of the U-shaped cross-section of said reinforcement element is provided inside a base of said connecting piece, and wherein outer ends of the legs of the U-shaped cross-section of said reinforcement element are bent inwardly.

2. A windscreen wiper device according to claim 1, wherein the reinforcement element is provided with weakening locations.

3. A windscreen wiper device according to claim 2, wherein the weakening locations comprise through holes.

4. A method for manufacturing a windscreen wiper device according to claim 1, wherein the plastic connecting device is cast in a mold around the metal reinforcement element.

5. A windscreen wiper device according to claim 1, wherein said metal reinforcement element is substantially entirely surrounded by said plastic connecting device as viewed in cross-section.

* * * * *